United States Patent
Hyun et al.

(10) Patent No.: US 11,481,043 B2
(45) Date of Patent: Oct. 25, 2022

(54) MULTI-FUNCTIONAL TOUCH KEYBOARD HAVING TOUCH SENSOR

(71) Applicant: BLD CO., LTD., Seoul (KR)

(72) Inventors: Euy Sub Hyun, Seoul (KR); Tae Hoo Jung, Seoul (KR)

(73) Assignee: BLD CO., LTD., Seoul (KR)

( * ) Notice: Subject to any disclaimer, the term of this patent is extended or adjusted under 35 U.S.C. 154(b) by 0 days.

(21) Appl. No.: 17/595,837

(22) PCT Filed: May 28, 2020

(86) PCT No.: PCT/KR2020/006900
§ 371 (c)(1),
(2) Date: Nov. 26, 2021

(87) PCT Pub. No.: WO2020/242215
PCT Pub. Date: Dec. 3, 2020

(65) Prior Publication Data
US 2022/0147156 A1 May 12, 2022

(30) Foreign Application Priority Data
May 28, 2019 (KR) .................. 10-2019-0062297

(51) Int. Cl.
*G09G 5/00* (2006.01)
*G06F 3/02* (2006.01)
(Continued)

(52) U.S. Cl.
CPC .......... *G06F 3/0219* (2013.01); *G06F 1/1671* (2013.01); *G06F 3/03547* (2013.01);
(Continued)

(58) Field of Classification Search
CPC .... G06F 1/1616; G06F 1/1647; G06F 1/1662; G06F 1/1671; G06F 1/169;
(Continued)

(56) References Cited

U.S. PATENT DOCUMENTS

| 2015/0035757 A1* | 2/2015 | Mahlmeister | ......... A63F 13/213 345/173 |
| 2015/0185865 A1* | 7/2015 | Laubach | ............... G06F 3/0213 345/160 |

FOREIGN PATENT DOCUMENTS

| KR | 10-2004-0032768 A | 4/2004 |
| KR | 10-2008-0006493 A | 1/2008 |

(Continued)

OTHER PUBLICATIONS

International Search Report for PCT/KR2020/006900 dated, Sep. 15, 2020 (PCT/ISA/210).
(Continued)

*Primary Examiner* — Insa Sadio
(74) *Attorney, Agent, or Firm* — Sughrue Mion, PLLC

(57) ABSTRACT

The present invention discloses a multi-functional touch keyboard having a touch sensor, including: a key cap unit 110; a driving circuit unit (not shown); a support 120; a touch pad 130 composed of touch sensors respectively formed on the upper ends of multiple key caps 111 grouped in a specific shape; a left click key 141 and a right click key 142 formed adjacent to both ends of the touch pad 130; and a control unit (not shown) which moves a cursor in conjunction with a touch of the touch pad 130 and performs a click function by means of pressing of the click key, in which the multi-functional touch keyboard performs a touch pad function as a graphic controller while performing basic functions as a keyboard.

2 Claims, 14 Drawing Sheets

(51) Int. Cl.
  *G06F 1/16*        (2006.01)
  *G06F 3/0354*      (2013.01)
  *H01H 13/7057*     (2006.01)
  *H01H 13/803*      (2006.01)

(52) U.S. Cl.
  CPC ...... *H01H 13/7057* (2013.01); *H01H 13/803* (2013.01); *G06F 2203/04808* (2013.01)

(58) Field of Classification Search
  CPC . G06F 2203/04803; G06F 2203/04808; G06F 3/02; G06F 3/0219; G06F 3/0354; G06F 3/03547; G06F 3/038; G06F 3/0485; H01H 13/7057; H01H 13/803
  See application file for complete search history.

(56) References Cited

FOREIGN PATENT DOCUMENTS

| KR | 10-1007382 B1 | 1/2011 |
|---|---|---|
| KR | 10-1042285 B1 | 6/2011 |
| KR | 10-1118224 B1 | 3/2012 |
| KR | 10-2017-0114300 A | 10/2017 |
| KR | 10-2018-0055783 A | 5/2018 |

OTHER PUBLICATIONS

Korean Notice of Final Rejection for 10-2019-0062297 dated, Jul. 29, 2021.
Korean Grant of Patent for 10-2019-0062297 dated, Oct. 18, 2021.

* cited by examiner (a)

(b)

(a)

(b)

(a)

(b)

Existing screen

Selecting YouTube full screen mode or another video

Screen of present invention

Separating YouTube full screen mode
reproduction screen and search screen

MULTI-FUNCTIONAL TOUCH KEYBOARD HAVING TOUCH SENSOR

CROSS REFERENCE TO RELATED APPLICATIONS

This application is a National Stage of International Application No. PCT/KR2020/006900, filed May 28, 2020, claiming priority to Korean Patent Application No. 10-2019-0062297, filed May 28, 2019, the entire disclosures of which are incorporated herein by reference.

TECHNICAL FIELD

The present invention relates to a multi-functional touch keyboard having a touch sensor, and more particularly, to a multi-functional touch keyboard having a touch sensor, which performs a basic function as a keyboard and performs a touch pad function as a graphic controller.

BACKGROUND ART

As everyone knows, in related art, when a user performs a document task, a graphic task, web surfing, or YouTube viewing using a keyboard in a PC or a laptop computer, while the user inputs a character by using the keyboard, the user's hand needs to frequently deviate from a location of the hand on the keyboard and moves to a mouse positioned near the keyboard, or a mouse or a touch pad in a lower end of the keyboard generally in the case of the laptop computer, to perform a mouse operation.

Therefore, technology is required, in which the mouse and the touch pad of the laptop computer in related art, which perform a function as a graphic controller are replaced to exclude inconvenience of operating a computer with a separate graphic controller and in particular, in the case of the laptop computer, the touch pad is replaced and removed, thereby providing an efficient function by utilizing spaces occupied by a keyboard touch pad occupied by the touch pad and a lower palm rest.

Further, by considering that there is a trend that contents displayed on a monitor screen are gradually provided in various forms and plentifully in a reality in which it is routinized to receive and relay on convenience depending on image operations of computers or TV devices as a result of culture and civilization development, with a limited area of the existing monitor screen, not only a content provider has a limit in providing contents of a desired format and a desired quantity in order to achieve an object of content providing, but a user should also endure inconvenience and inefficiency of a screen operation due to overlapping and splitting reduction of multiple screens provided through the limited area.

Technology is required, which can contribute to an efficient screen operation on a monitor by providing a sub monitor in order to overcome a limited quantity and a format limitation in displaying the screen contents to the existing monitor.

Meanwhile, as prior art related thereto, in Korean Patent Registration No. 1042285, a keyboard is provided, in which a touch pad having mouse and multi-touch functions in which surfaces of two or more contiguous key caps among multiple key caps on the keyboard are formed as the touch pad, a motion of a key input means applied to the touch pad is sensed, and a mouse or multi-touch operation corresponding to the sensed motion is performed is integrated into the key cap, to allow surfaces of specific key caps on the keyboard to perform the mouse function.

However, the touch pad is divided into the left and the right, which is different from a general touch pad shape, and practicality and efficiency are thus low, and a key performing a left-right click function is not separately configured, and as a result, a possibility of an error is high upon practical use and there is inconvenience in that the touch pad should be manipulated by both hands.

DISCLOSURE

Technical Problem

The present invention is directed to providing a multi-functional touch keyboard having a touch sensor, which has a touch sensor part and a click button part of a touch pad itself with a minimum area so as to perform a basic function as a graphic controller by replacing an existing touch pad.

Technical Solution

In order to achieve the object, the present invention provides a multi-functional touch keyboard having a touch sensor, including: a key cap unit with a character key cap, a function key cap, a numeric key cap, a special key cap, and a direction key cap; a driving circuit unit constituted by a contact point and a membrane switch each coupled to a lower end of a corresponding key cap of the key cap unit; a support supporting the membrane switch; a touch pad composed of touch sensors respectively formed on the upper ends of the multiple key caps grouped in a specific shape; a left click key and a right click key formed adjacent to both ends of the touch pad; and a control unit which moves a cursor in conjunction with a touch of the touch pad and performs a click function by means of pressing of the click keys, in which the multi-functional touch keyboard performs a touch pad function as a graphic controller while performing basic functions as a keyboard.

Here, the touch pad may be formed by grouping up to the character key caps in a reverse triangular form based on a space key cap.

Further, the click key may be formed on each of both ends of the space key cap.

Further, the touch sensor may be formed on each of upper ends of the space key cap, six key caps on a lower line of the character key cap, seven key caps of an intermediate line, and eight key caps of an upper line.

In addition, the key cap unit and the touch pad may be disposed at a touch pad of a laptop computer or a lower palm rest location.

Further, a partition having a predetermined height may be formed on an upper periphery of the corresponding key cap constituting an outline of the touch pad to separate a touch area of the touch pad.

Alternatively, the corresponding key cap constituting the outline of the touch pad and another adjacent key cap may be formed spaced apart from each other at a predetermined distance to separate the touch area of the touch pad.

Further, a vertical scroll function may be performed by a touch of the touch pad interlocking with pressing of the left click key or the right click key and a double click function may be performed by double strokes of the left click key or the right click key.

Further, a horizontal scroll may be performed by horizontally touching a touch pad area on an upper end surface of the space key cap in conjunction with double strokes of the right click key, a vertical scroll may be performed by vertically touching the touch pad area except for the space key cap, a left click and double clicks may be performed by a stroke and double strokes of the left click key, and a right click may be performed by a stroke of the right click key.

Advantageous Effects

According to the present invention, a touch sensor of a touch pad is attached to a keyboard surface to perform a function, but is not attached to an entire surface of a keyboard, but provides an area at least as large as an existing touch pad by considering operational efficiency and convenience, and economics of production, and the touch sensor is attached up to a surface part of a character keyboard in a reverse triangular from starting from a space bar of a basic type keyboard to replace the mouse and a touch pad of a laptop computer in the related art performing a function as a graphic controller, and as a result, convenience of operating a computer with a separate graphic controller is excluded and in particular, in the case of the laptop computer, the touch pad is replaced and removed, thereby providing an efficient function by utilizing spaces occupied by a keyboard touch pad occupied by the touch pad and a lower palm rest.

Further, there is an effect that each of a left click key and a right click key is configured by dividing the space bar to perform a left-right click function of the mouse or the touch pad.

Further, there may be an effect of the invention that the touch keyboard itself performs the function as the graphic controller and inconvenience that the mouse or the touch pad as the graphic controller is separately provided is excluded, and in particular, there is a significant meaning in that an opportunity to solve a premise of providing a sub monitor is provided by applying the touch keyboard to an integral device such as the laptop computer, resulting in becoming a start point of enjoying a benefit of providing dual monitors.

Furthermore, there is no room for a controversy that providing the sub monitor allows both a provider and a user of the screen to enjoy the benefit. Therefore, providing the dual monitors for the operation of the screen will be naturally settled as normalization and standardization as a general trend, and consequently, there is an effect that as screen providers are to provide various forms of screens and functions suitable for dual monitors of a normalized and standardized ratio as such a general trend, a turning point of a change in monitoring providing aspect is provided to become a trigger that reorganizes a market.

MODES OF THE INVENTION

Hereinafter, an exemplary embodiment of the present invention having the above-described features will be described in more detail with reference to the accompanying drawings.

Figure 1:
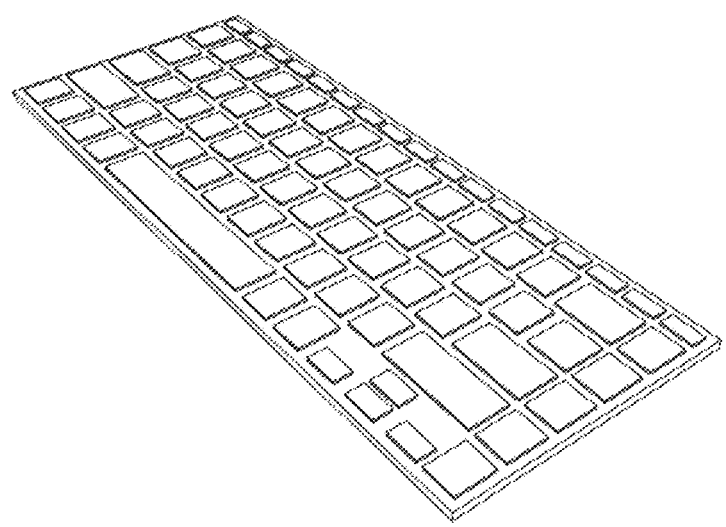
FIG. 1 illustrates an example of applying a multi-functional touch keyboard having a touch sensor according to an exemplary embodiment of the present invention to a general keyboard.
Figure 1:
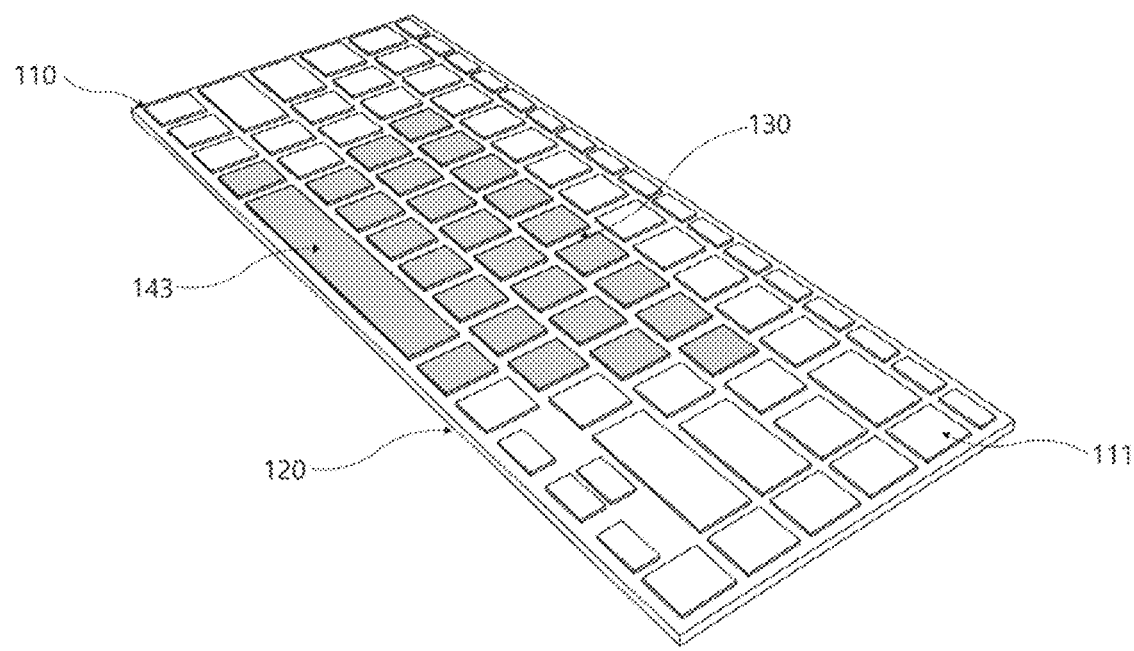
Figure 2:
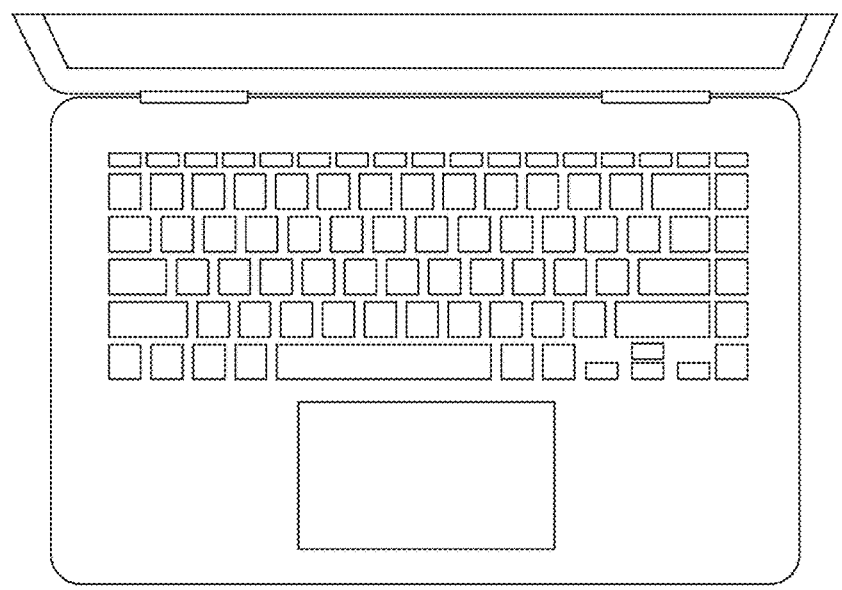
FIG. 2 illustrates an example of applying the multi-functional touch keyboard having a touch sensor according to an exemplary embodiment of the present invention to a dual-monitor laptop computer keyboard.
Figure 2:
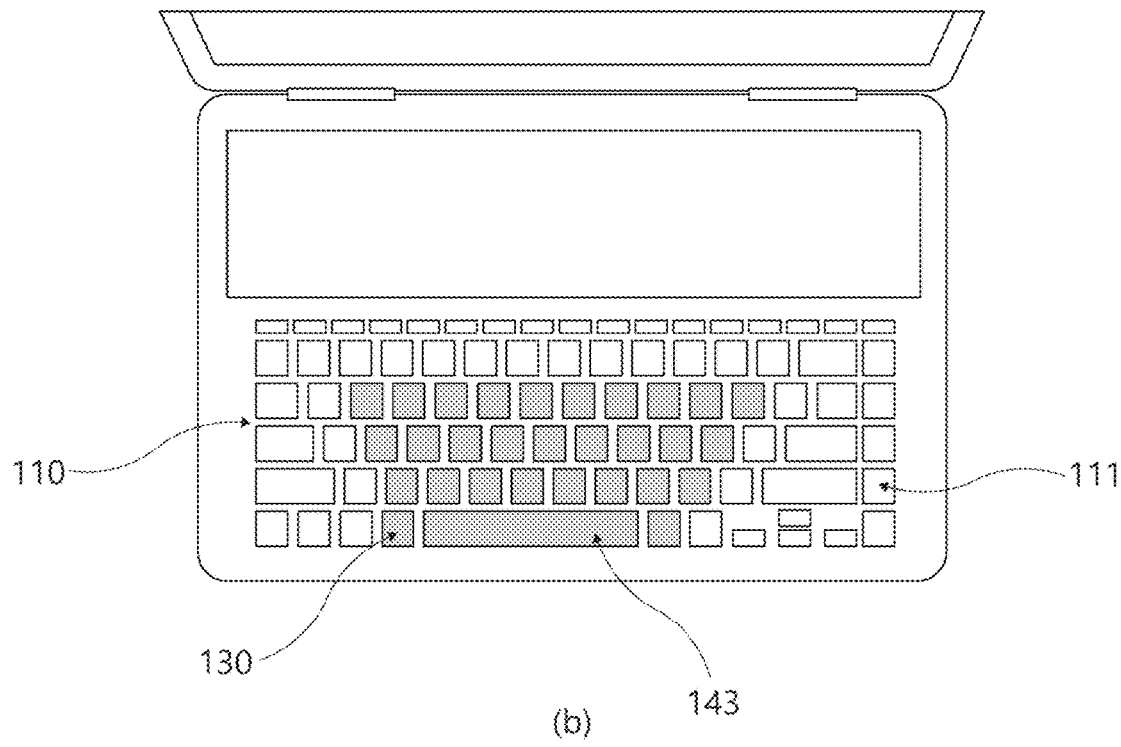
Figure 3:
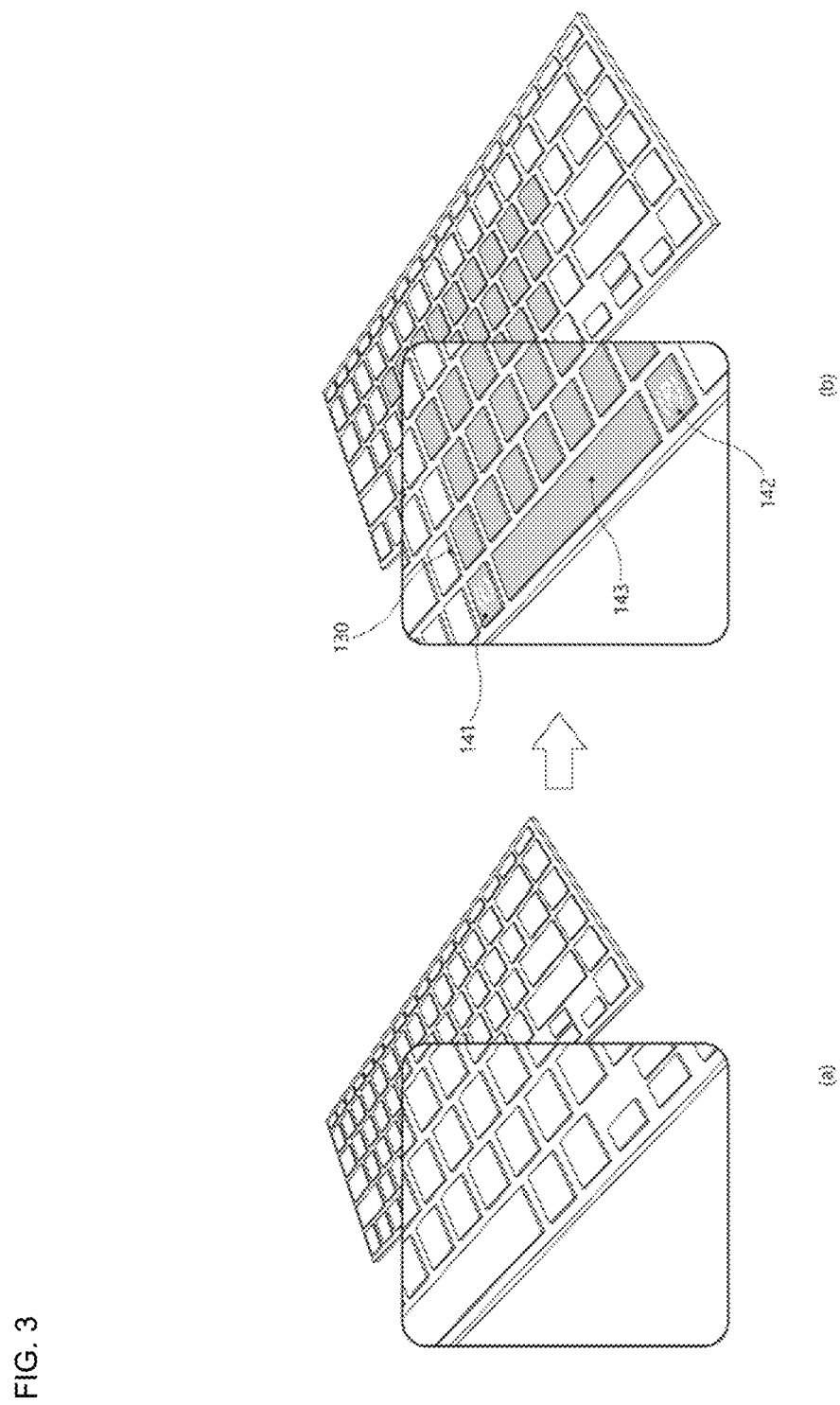
FIG. 3 is an enlarged diagram of a click key of the multi-functional touch keyboard having a touch sensor in FIGS. 1 and 2.
Figure 4:
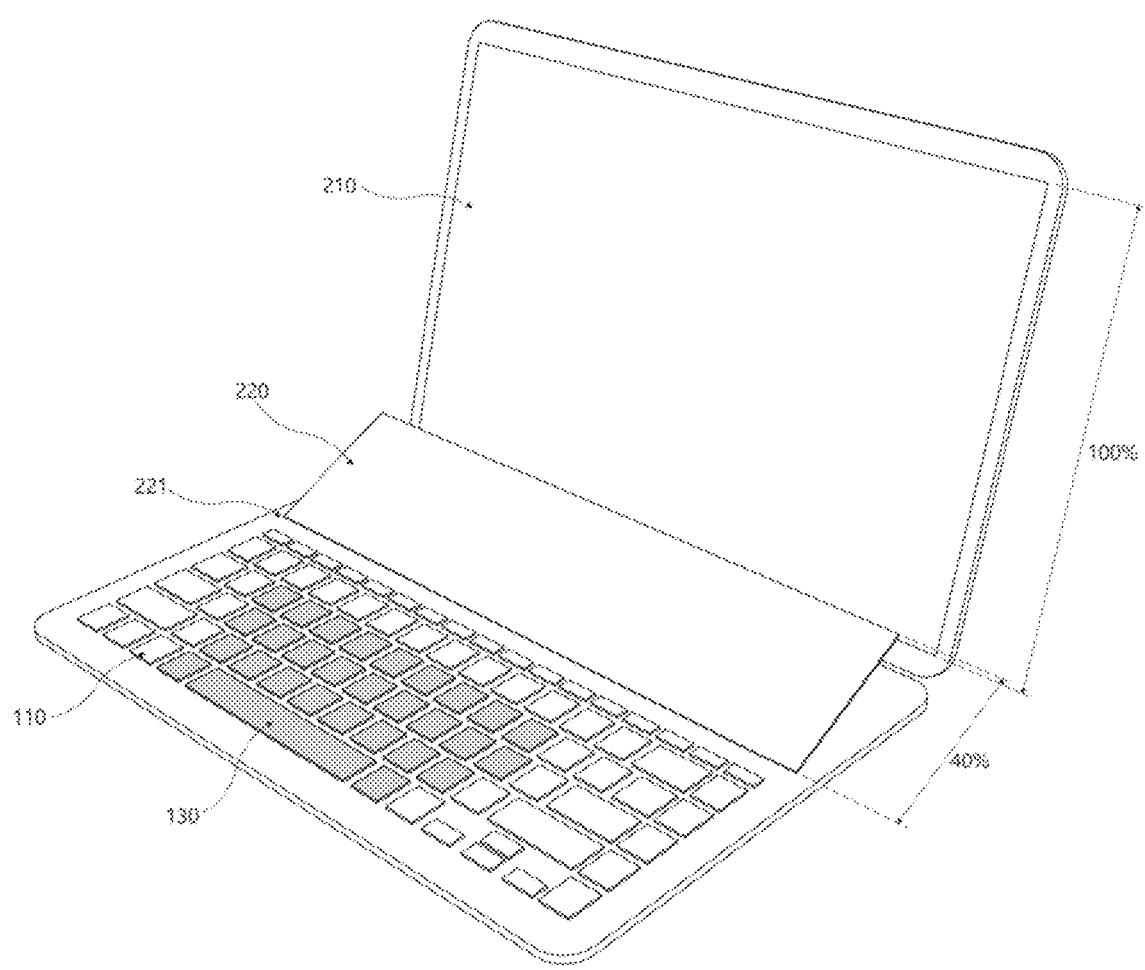
FIG. 4 illustrates application of the multi-functional touch keyboard having a touch sensor in FIG. 2 to a dual-monitor laptop computer.
Figure 5:
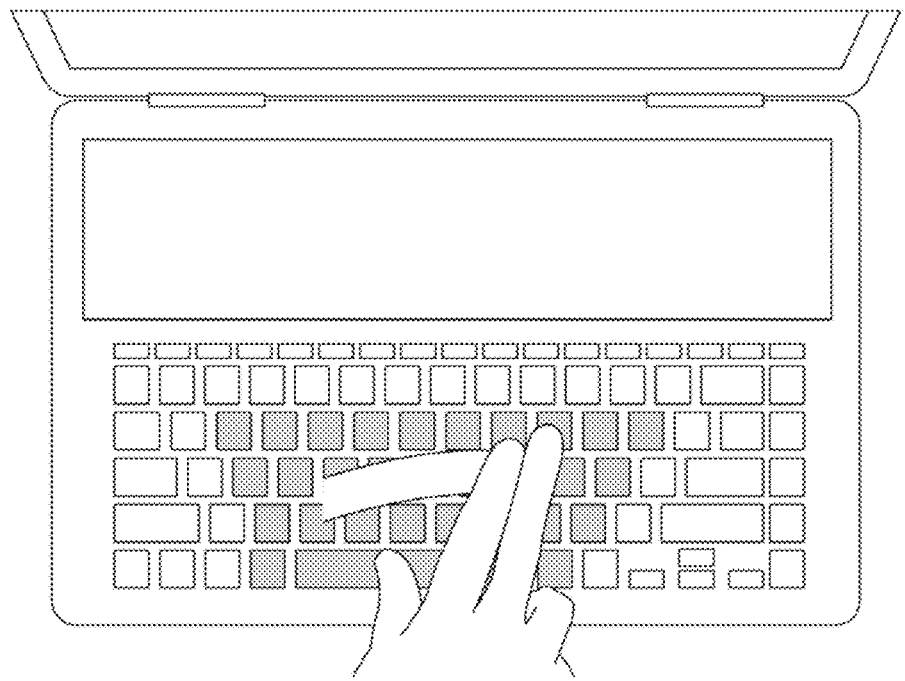
FIG. 5 illustrates a use example of the multi-functional touch keyboard having a touch sensor in FIG. 4.
Figure 5:
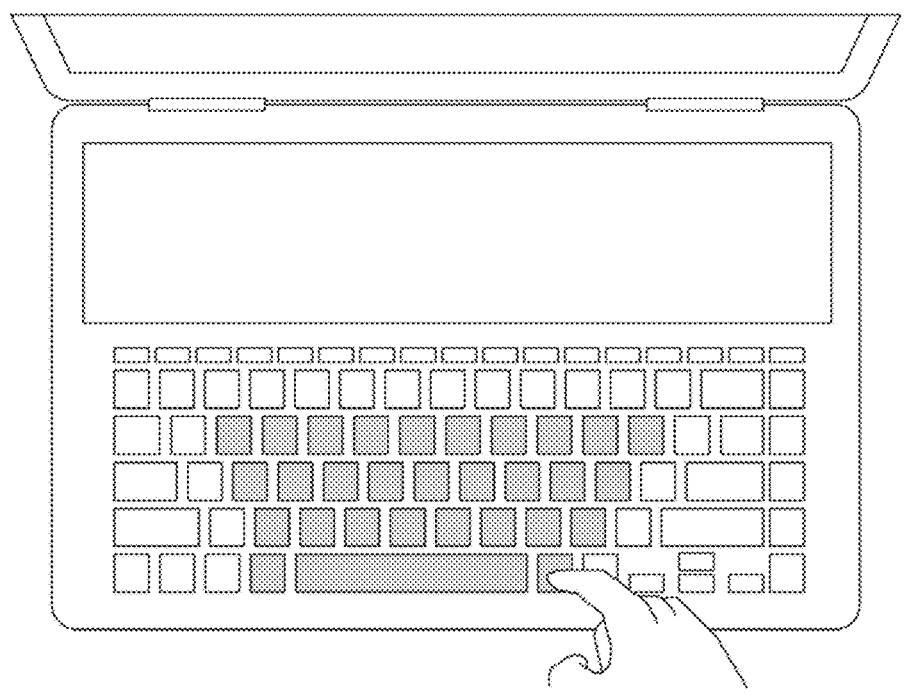

FIG. 1 illustrates an example of applying a multi-functional touch keyboard having a touch sensor according to an exemplary embodiment of the present invention to a general keyboard, FIG. 2 illustrates an example of applying the multi-functional touch keyboard having a touch sensor according to an exemplary embodiment of the present invention to a dual-monitor laptop computer keyboard, FIG. 3 is an enlarged diagram of a click key of the multi-functional touch keyboard having a touch sensor in FIGS. 1 and 2, FIG. 4 illustrates application of the multi-functional touch keyboard having a touch sensor in FIG. 2 to a dual-monitor laptop computer, and FIG. 5 illustrates a use example of the multi-functional touch keyboard having a touch sensor in FIG. 4. Here, (a) of FIG. 1 and (b) of FIG. 2 each illustrate a conventional keyboard configuration and a conventional keypad and touch pad configuration of a laptop computer.

Referring to FIGS. 1 to 5, there is a gist that the multi-functional touch keyboard having a touch sensor according to an exemplary embodiment of the present invention includes a key cap unit 110, a driving circuit unit (not illustrated), a support 120, a touch pad 130 constituted by touch sensors formed on upper ends of multiple key caps 111 grouped in a specific shape, a left click key 141 and a right click key 142 formed adjacent to both ends of the touch pad 130, and a control unit (not illustrated) moving a cursor in conjunction with a touch of the touch pad 130 and performing a click function by pressing the click keys, to perform a basic function as the keyboard and perform a touch pad function as a graphic controller.

First, the key cap unit 110 is constituted by a character key cap, a function key cap, a numeric key cap, a specific key cap, and a direction key cap which are arranged differently according to the type of an applied desktop computer, a laptop computer, or an ultrabook computer, and various keyboard specifications of 86 keys, 101 keys, 103 keys, or 106 keys.

Next, the driving circuit unit is constituted by a contact point and a membrane switch coupled to each of a lower end of the corresponding key cap 111 of the key cap unit 110, but may be configured variously according to a membrane scheme, a non-contact scheme, or a mechanical scheme, and the support 120 may support the membrane switch in response thereto.

Next, the touch pad 130 is constituted by multiple touch sensors formed on the upper ends of the multiple key caps 111 grouped in a specific shape, respectively as illustrated in (b) of FIG. 1 (light colored part) and (b) of FIG. 2 (the same area as the light colored part of (b) of FIG. 1).

Here, the touch pad 130 may be formed by grouping up to the character key caps in a reverse triangular form based on a space key cap 143.

For example, the touch sensor is formed on each of upper ends of the space key cap 143, six key caps (from 'C' to ',') 111 on a lower line of the character key caps, seven key caps (from 'D' to 'L') 111 on an intermediate line, and eight key caps (from 'E' to 'P') 111 on an upper line to constitute the reverse triangular form touch pad 130.

Meanwhile, a partition (not illustrated) having a predetermined height is formed on an upper periphery of the corresponding key cap 111 constituting an outline of the touch pad 130 to separate a touch area of the touch pad 130.

That is, when the touch area is recognized by a tactile according to the touch pad outline represented by FIG. 1B (blue) and FIG. 2B (red) to recognize the touch pad 130 without deviating a user's view from a screen under the work.

Alternatively, the corresponding key cap 111 constituting the outline of the touch pad 13 and another adjacent key cap 111 are formed spaced apart from each other at a predetermined distance (not illustrated) to separate the touch area of the touch pad 130.

That is, when the touch area is recognized by a tactile according to the touch pad outline represented by (b) of FIG. 1 (light colored part) and (b) of FIG. 2 (the same area as the light colored part of (b) of FIG. 1) to recognize the touch pad 130 without deviating a user's view from a screen under the work.

Next, the left click key 141 and the right click key 142 performing a left click function and a right click function of a general touch pad or mouse are formed adjacent to both ends of the touch pad 130.

That is, as enlarged and illustrated in FIG. 3, the left click key 141 and the right click key 142 are separately formed on both ends of the space key cap 143, respectively to perform the left click function and the right click function by pressing the left click key 141 and the right click key 142.

Here, the left click key 141 and the right click key 142 divide both end portions of the space key cap 143 to which a sufficient area is provided into sizes of the character key caps, respectively to provide a left click button and a right click button.

Meanwhile, when a horizontal scroll is performed by horizontally touching a touch pad area of an upper surface of the space key cap 143 in conjunction with double strokes of the right click key 142, and a vertical scroll is performed by vertically touching a touch pad area except for the space key cap 143, and a left click and double clicks may be performed by a stroke and double strokes of the left click key 141, respectively and a right click may be performed by the stroke of the right click key 142.

Next, the control unit moves a cursor on a display in conjunction with the touch of the touch pad 130, and a click function on the display is performed by pressing the left click key 141 and the right click key 142.

Therefore, as illustrated in (a) of FIG. 5, the cursor may be moved in conjunction with the touch of the touch pad 130, and as illustrated in (b) of FIG. 5, the click function may be performed by pressing the left click key 141 and the right click key 142.

Figure 6:
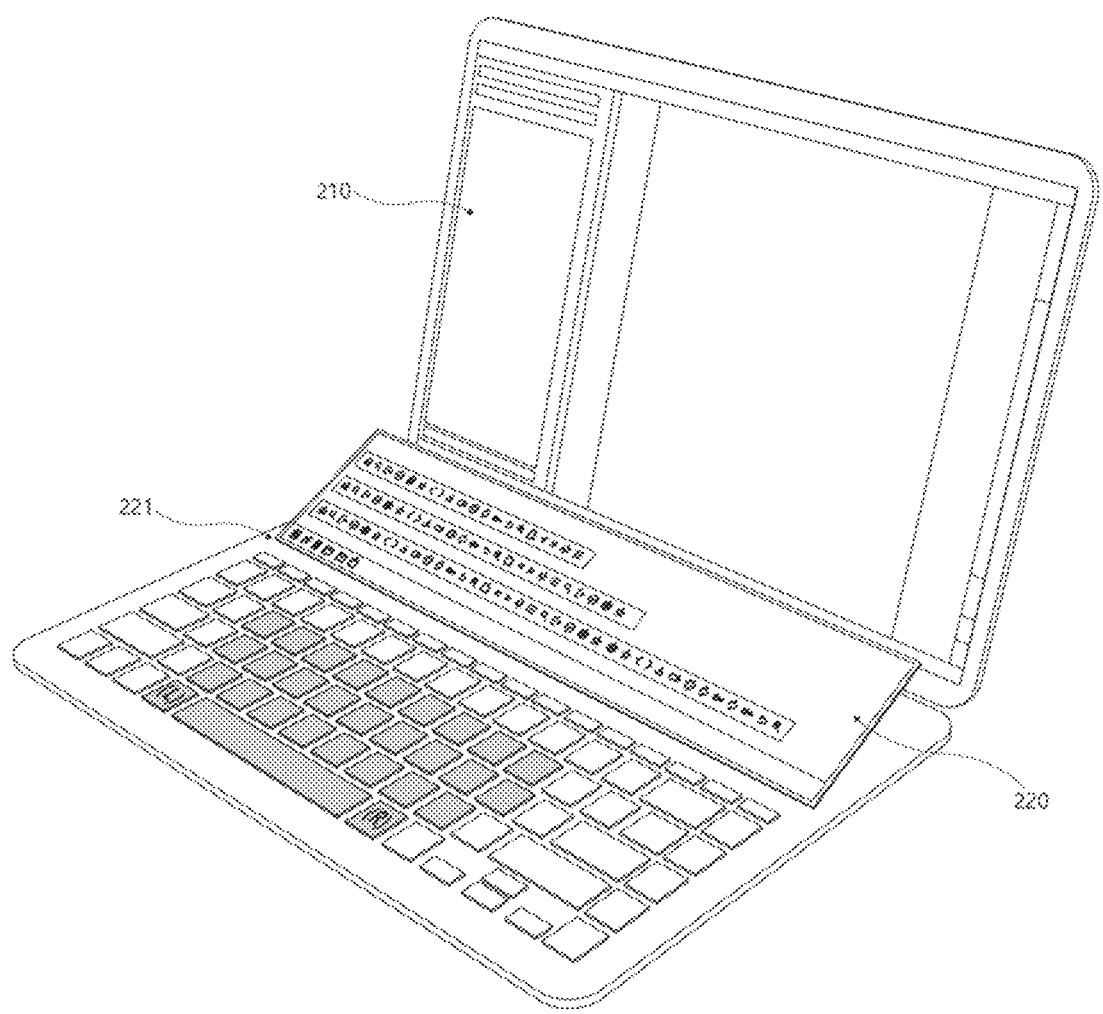
FIG. 6 illustrates utilization of the dual-monitor laptop computer to which the multi-functional touch keyboard having a touch sensor in FIG. 4 is applied.

Meanwhile, as illustrated in FIGS. 2, 4, and 6, the key cap unit 110 and the touch pad 130 are configured to be disposed at the location of the touch pad or the lower palm rest of a general laptop computer and a separate sub monitor 220 other than a main monitor 210 is formed in a free space on an upper end of the laptop computer to hinge-rotate based on a hinge axis 221 to enable an efficient screen operation on the monitor.

That is, if an additional sub monitor is provided while maintaining an structure and form of the laptop computer in the related art, a device becomes thicker and a weight of the device increases due to installation of an additional monitor, and as a result, this goes against the trend of light weight and slimming as a portable integral device. Therefore, even though the additional monitor is provided, it is premised that the existing slimming is maintained, and the weight does not increase by basically maintaining an integral type.

Therefore, referring to FIG. 4, while equally maintaining a horizontal width, a second size of the sub monitor 220 is formed as 35 to 45% of a first size of the main monitor 210, and preferably, 40%, and the light weight may be implemented by minimizing the weight due to the sub monitor 220 while ensuring readability and availability of the sub monitor 220.

For example, as illustrated in FIG. 6, the main monitor 210 and the sub monitor 220 divide the screen to provide each of different UIs to be operated as a monitor for an additional task or an auxiliary task in an inclined form at a predetermined angle by raising the upper end of the sub monitor 220 with the hinge axis 221 as a rotational axis upon use depending on user's efficiency and convenience.

By the way, the touch pad is replaced and removed by applying the touch keyboard to the laptop computer, and as a result, the touch pad is not required and a space at which the palm rest on the lower end of the keyboard occupied by the touch pad is positioned may be utilized, and unlike the existing laptop computer, the touch keyboard may be positioned in the lower space at which the ensured palm rest is positioned and the sub monitor may be disposed on the upper end where the keyboard used to be positioned, and a space capable of being provided with the sub monitor is provided by applying the touch keyboard to the integral device such as the laptop computer and providing an additional space for providing the sub monitor is excluded and a cause for an increase in existing thickness and weight of the laptop computer is not provided to satisfy a premise of providing the sub monitor.

Meanwhile, FIG. 6 illustrates utilization of the dual-monitor laptop computer to which the multi-functional touch keyboard having a touch sensor in FIG. 4 is applied, FIGS. 7A to 7C and 8A and 8B each illustrate monitor division use by a user's UI manipulation in the dual-monitor laptop computer in FIG. 6, and FIGS. 9A and 9B, 10A, 10B, 11, and 12 each illustrate monitor division use by a UI provided by a program provider in the dual-monitor laptop computer in FIG. 6 in comparison with the existing screen.

The main screen and the sub screen are divided by a UI manipulation according to a taste of the user and efficiency to display the divided main screen and sub screen on the main monitor 210 and the sub monitor 220, respectively.

That is, in the case of a screen provided so that a predetermined form is changed and rearranged as the user desires, the screen may be divided and operated according to the taste of the user and the efficiency.

As illustrated in FIGS. 6, 7A, 7B, 7C, 8A, and 8B, a screen operation example in which the user disposes the main screen in the main monitor 210 according to the convenience and separates and appropriately disposes the sub screen in the sub monitor 220 to efficiently operate the screen is described in detail as follows.

Figure 7A:
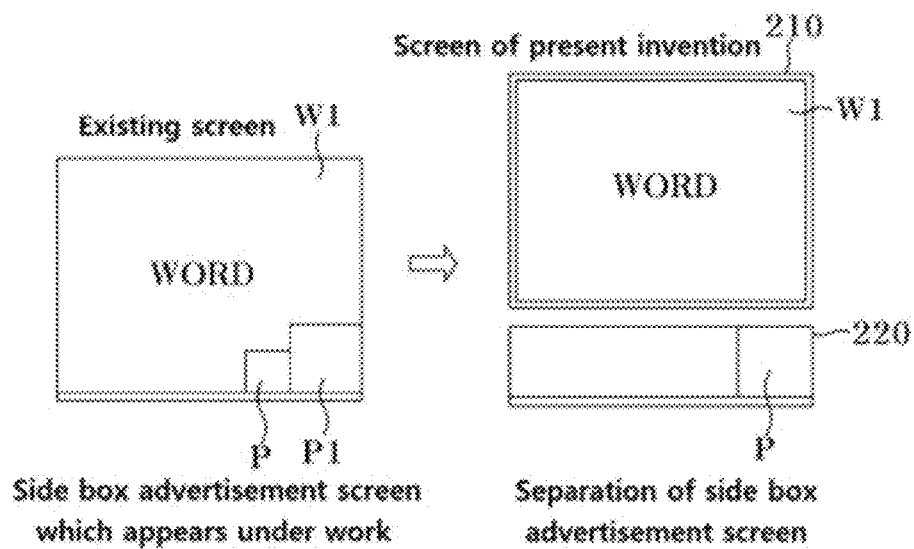
FIGS. 7A to 7C and 8A to 8B each illustrate monitor division use by a user's UI manipulation in the dual-monitor laptop computer in FIG. 6.
Figure 7B:
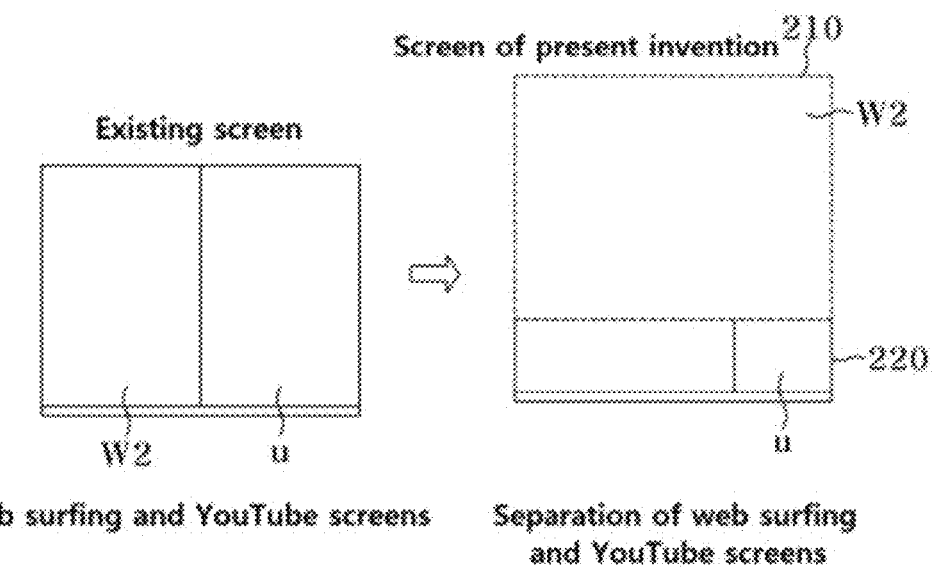
Figure 7C:
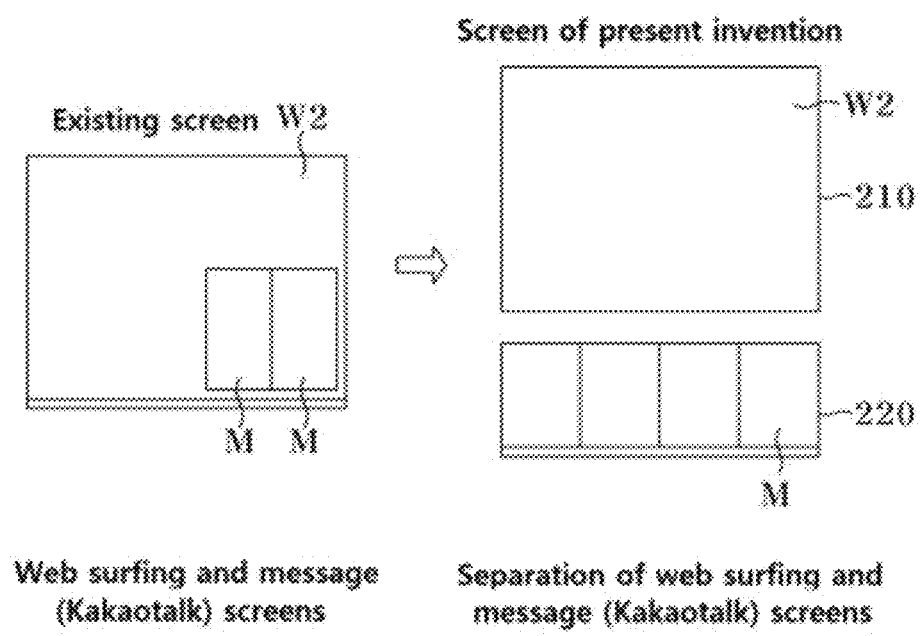

FIG. 7A illustrates an example in which a document edition window W1 and a pop-up advertisement window P are displayed, FIG. 7B illustrates an example in which a web surfing window W2 and a YouTube video window U are displayed, and FIG. 7C illustrates an example in which the web surfing window W2 and a messenger window M are displayed. As illustrated, in the conventional case, the document edition window W and the pop-up advertisement window P are overlapped and displayed (an existing screen of FIG. 7A), the web surfing window W and the YouTube video window U divide the screen (an existing screen of FIG. 7B), or the web surfing window W and the messenger window M are overlapped and displayed. According to an exemplary embodiment of the present invention, the main screen of document edition W1 or web surfing W2 under the work may be displayed in the main monitor 210, and, in the sub monitor 220, a pop-up advertisement (side box advertisement P) (a screen of the present invention in FIG. 7A) or a program update notification may be displayed. YouTube may be reproduced and displayed (a screen of the present invention in FIG. 7B), or a messenger or SNS may be displayed (a screen of the present invention in FIG. 7C).

Therefore, since a projection screen P of the pop-up advertisement and the program update notification which suddenly appears without notice under the work covers the main screen being worked and is displayed as a top screen, the projection screen P continuously becomes a subject of inconvenience and complaint to a user who wants to concentrate on the work. Therefore, a window taskbar is moved to and displayed in the sub screen and all advertisements and projection screens are displayed in the sub screen 220 to resolve the inconvenience and complaint.

Further, when the document edition or the web surfing is performed while watching YouTube, there is inconvenience that the screen is divided, and the size of the window is adjusted to be small so that both windows are viewed in order to enable multi-tasks. When the document edition or web surfing screen is displayed on the main screen and the YouTube is reproduced on the sub screen in order to overcome such inefficiency and inconvenience, the multi-tasks may be enabled easily.

Further, when a program which interlocks with a smartphone, such as the messenger (Kakaotalk, Line, Facebook messenger) or SNS (Twitter, Facebook, Instagram) is used while performing a main task such as the document edition or web surfing, the screen is overlapped and displayed, and as a result, message confirmation and transmission are inconvenient. Therefore, when the document edition or web surfing screen is displayed on the main screen and the messenger or SNS screen is disposed and used on the sub screen, the message confirmation is possible without screen switching to enable simultaneous tasks.

Figure 8A:
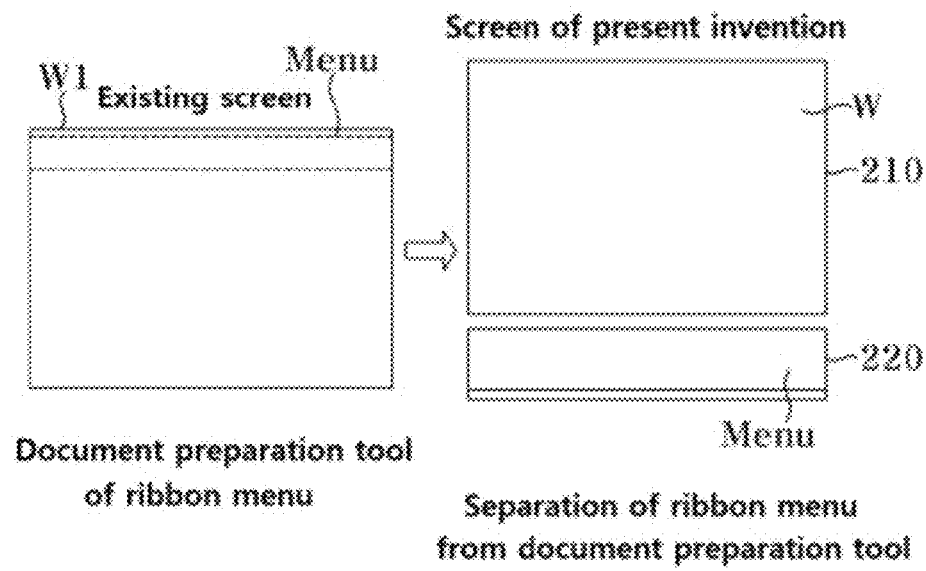
Figure 8B:
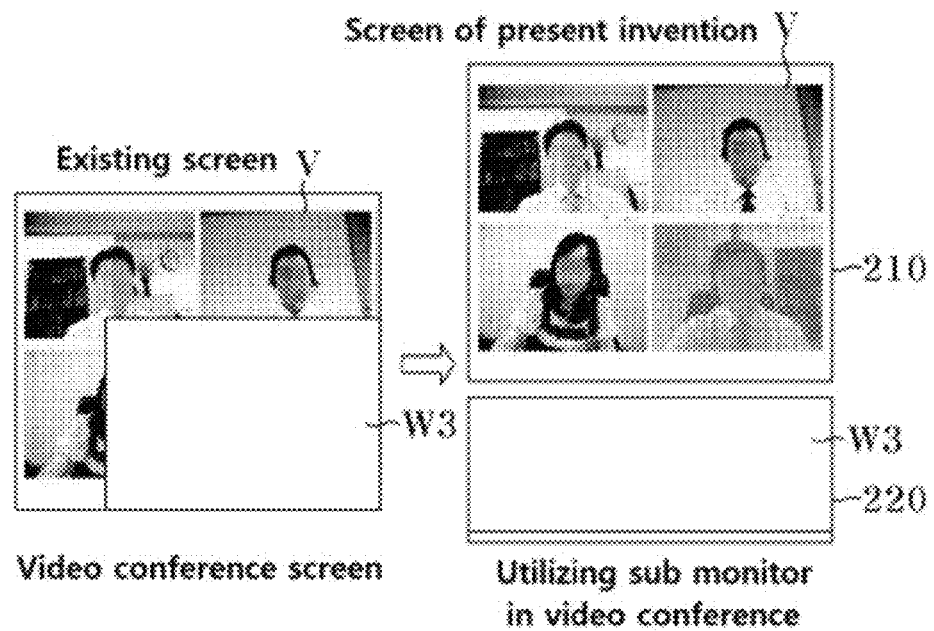

Further, referring to FIGS. 8A and 8B, a document preparation tool, a development tool, or an image edition tool may be displayed, a ribbon menu of the corresponding tool may be disposed and displayed in the sub monitor 220 (FIG. 8A), a video conference multi-video V may be displayed in the main monitor 210, and a sub screen W3 which is under an auxiliary task may be displayed in the sub monitor 220 (FIG. 8B).

Therefore, as a requirement of the user is complicated, functions of the document preparation tool, the development tool, and the image edition tool are diversified and the tools are multi-functioned in order to accommodate the complicated requirement, and there are more and more icons to be displayed in the ribbon menu and thus, an area displaying the menu is gradually widened and a utilizable main screen of the main monitor 210 is gradually reduced. To improve this, when the ribbon menu of each tool and the main task window are separated, and only the main task window is disposed on the main screen and the ribbon menu is disposed on the sub screen, spatial utilization is maximized to provide a main task window having a maximum size.

Further, when auxiliary materials required for a meeting is searched or the meeting is performed while viewing materials to be referred, during a video conference in a full screen mode with multiple counterparts, if material searching and reference materials are executed on the sub screen, an efficient video conference may be enabled.

Alternatively, as illustrated in FIGS. 9 to 12, a UI modified, changed, and provided by the program provider may be divided into the main screen and the sub screen, and displayed in the main monitor 210 and the sub monitor 22, respectively.

That is, as a case where the user may not arbitrarily modify, change, and dispose the UI, a screen operation example in which a company providing a program modifies, changes, and provides the UI of the screen according to the dual monitors at first in order to efficiently use a screen space of the dual monitors to efficiently use the space is described as follows.

Figure 9A:
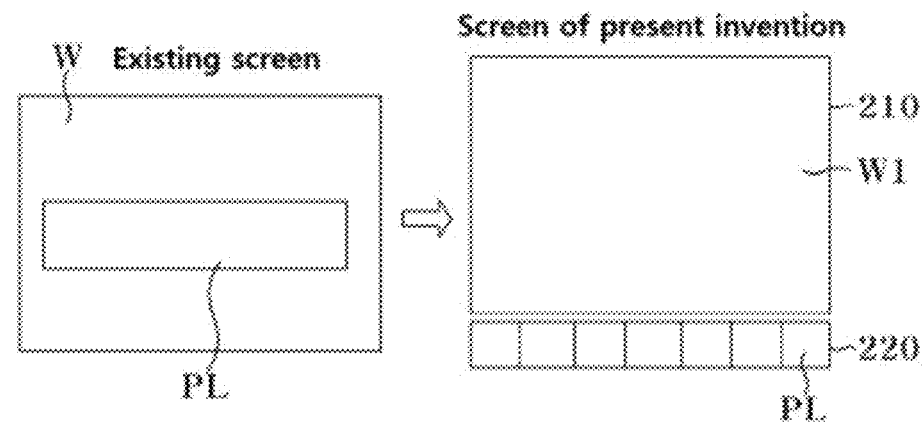
FIGS. 9A, 9B, 10A, 10B, 11 and 12 each illustrate monitor division use by a UI provided by a program provider of the dual-monitor laptop computer in FIG. 6.
Figure 9B:
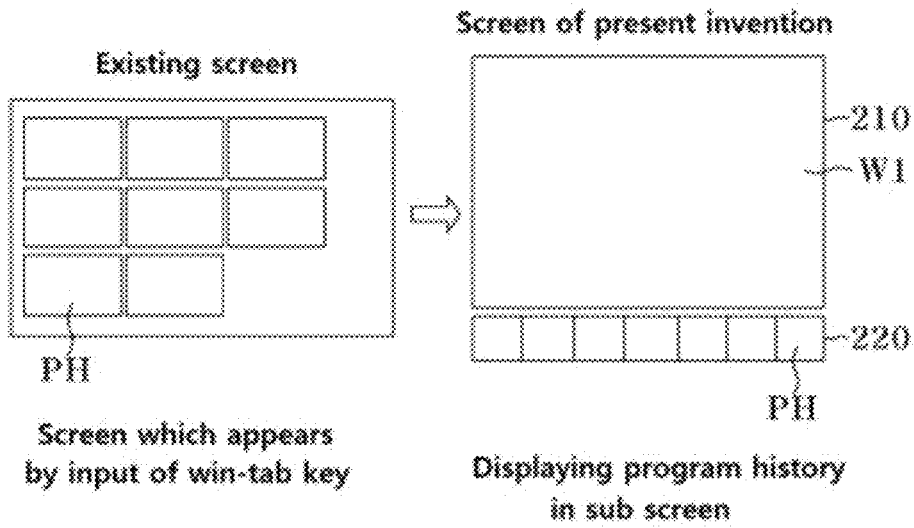
Figure 10A:
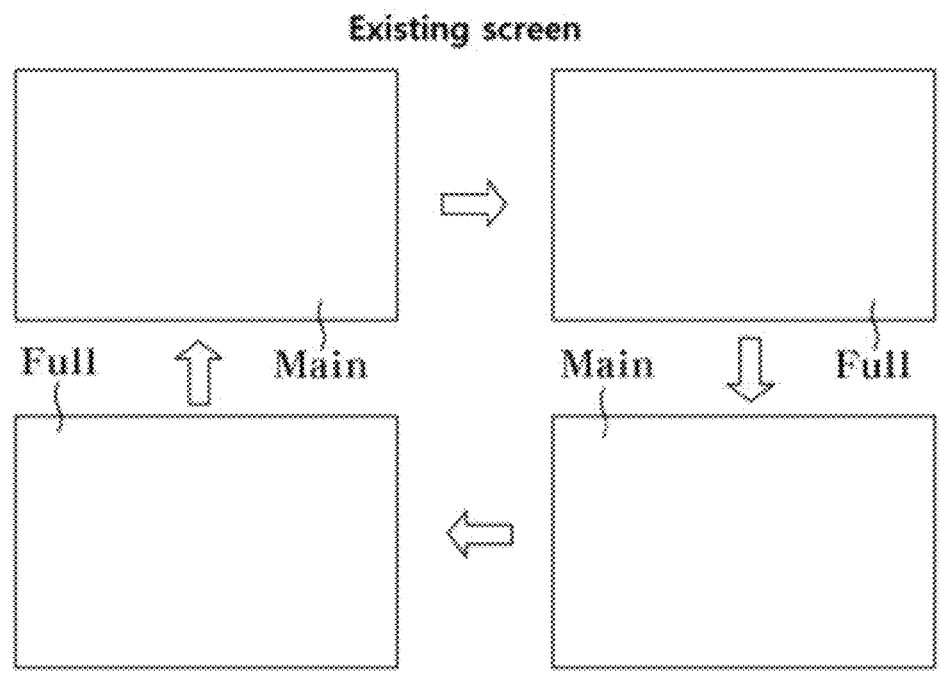
Figure 10A:
Figure 10A:
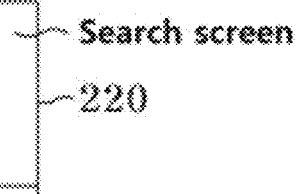
Figure 10B:
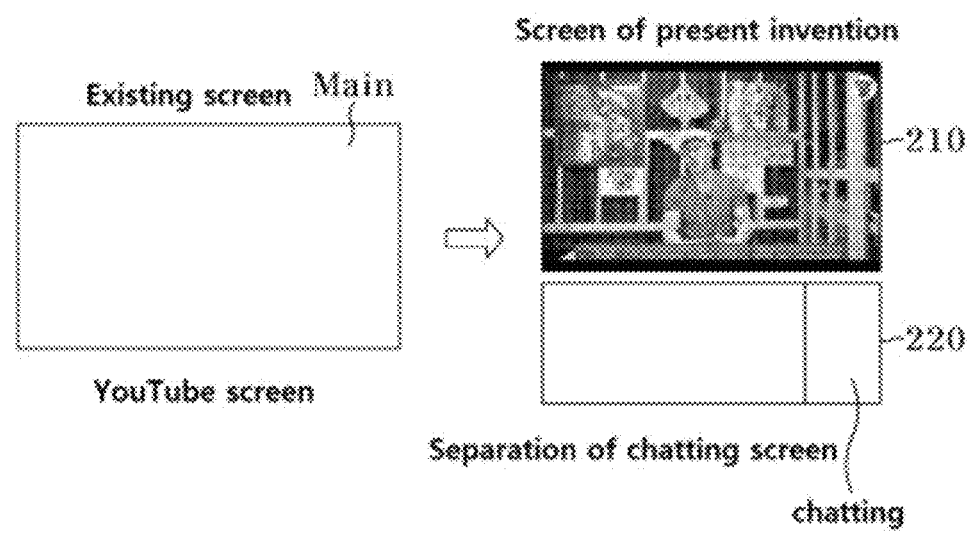

Referring to FIGS. 9A and 9B, the main screen under the work may be displayed in the main monitor 210, and, in the sub monitor, a program list which is running may be displayed (FIG. 9A), or a recently used file or a recently used program may be displayed (FIG. 9B).

Therefore, as illustrated in FIG. 9A, the sub monitor 220 is used as a taskbar/[currently running program list] display area, and when an alt-tab or win-tab key is input, [currently running program list] may be displayed and the program may be selected in the list and switched and displayed to the main window, but there is a disadvantage in that [currently running program list] is displayed on the main window under the work, and as a result, when [currently running program list] is continuously displayed by utilizing the sub screen, switching to a required program may be enabled by one motion.

Further, as illustrated in FIG. 9B, when the win-tab key is input, [program list which run up to now] may be displayed on a lower end of [currently running program list], when the program is selected in the list, the corresponding program may be executed and displayed in the main window, and there is a disadvantage in that [program list which run up to now] is displayed on the main window under the work and the list may be viewed after two operations of pressing the win-tab key and moving the win-tab key downward, and as a result, when [program list which run up to now] is continuously displayed by utilizing the sub screen, switching to a required program may be easily enabled.

Figure 11:
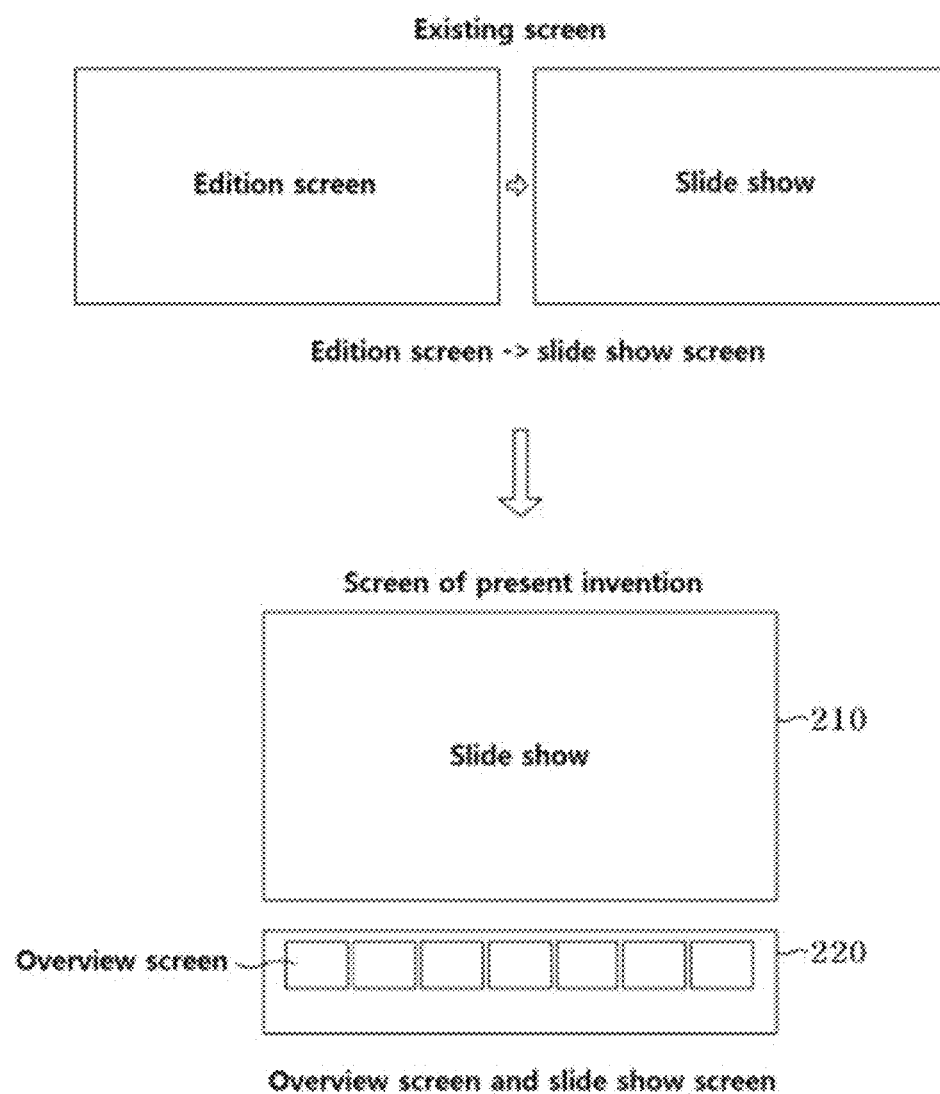
Figure 12:
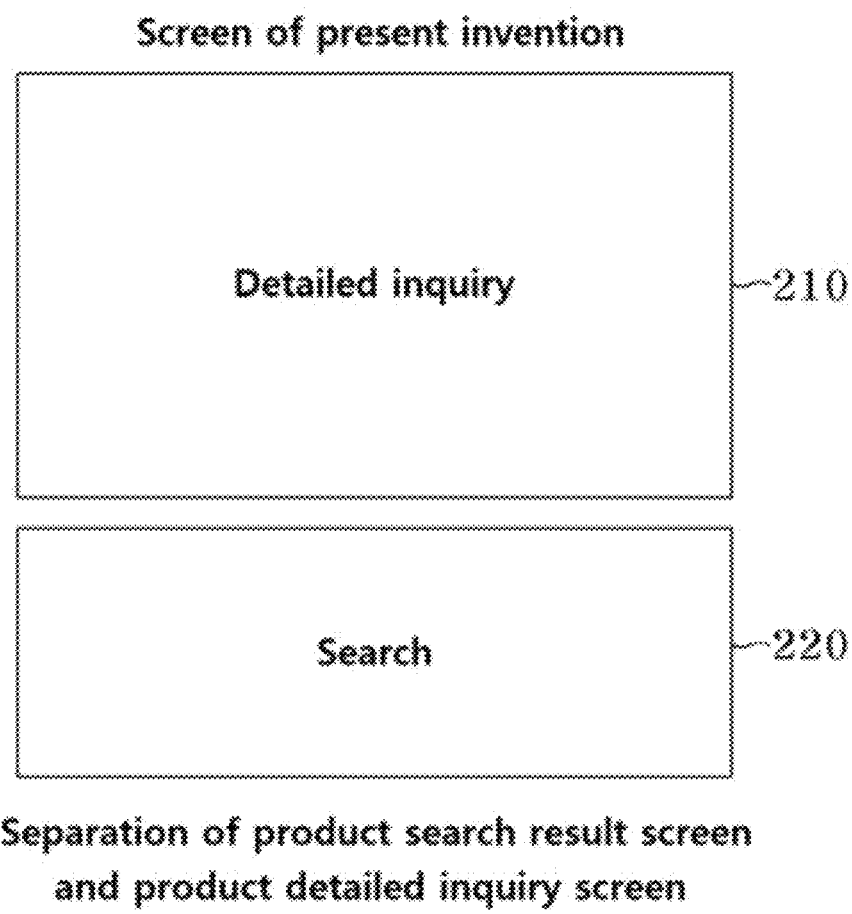

Further, referring to FIGS. 10 to 12, a YouTube video may be displayed in the main monitor 210 in a YouTube full screen mode and a YouTube video list may be displayed in the sub monitor 220 (FIG. 10A), a streamer video may be displayed in the main monitor 210 and a chatting screen may be displayed in the sub monitor 220 (FIG. 10B), a slide show screen of a presentation program may be displayed in the main monitor 210 and a slide overview screen or an edition screen of the presentation program may be disposed and displayed in the sub monitor 220 (FIG. 11), or a search result list page of a web shopping homepage may be displayed in the main monitor 210 and a product detail information page for a product selected in a search result list may be displayed in the sub monitor 220 (FIG. 12).

Therefore, in order to view another video while watching the YouTube in the full screen mode, another video may be selected only when the full screen mode is terminated, but when the YouTube may be reproduced on the main screen in the full screen mode, and a video to be reproduced next is selected while viewing a list to be reproduced on the sub screen, a next video may be watched by one motion, so it may be convenient.

Further, in a network game and a YouTube broadcast, when users having a common goal are gathered and are chatting in order to communicate with each other while playing a game or viewing a broadcast, chatting contents are primarily displayed at one side of the screen and displayed in a part of a game screen or a part of a broadcast screen, and in the case of the YouTube, when the broadcast screen is displayed in the full screen mode, the chatting contents may not be viewed. Therefore, even though the game screen or the broadcast screen is displayed on the main screen in the full screen mode by separating the chatting screen from a network game screen or a YouTube broadcast screen, the chatting contents may be viewed on the sub screen to facilitate game execution and YouTube broadcast watching.

Further, when a slide is edited in Powerpoint, and then the screen is moved to the slide show screen, the slide is displayed in the full screen mode, and as a result, it is inconvenient that the slide screen displayed in the full screen mode should be terminated in order to edit the slide or select another slide. Therefore, when the slide overview screen or the edition screen is disposed and displayed on the sub screen while the slide show screen is continuously displayed on the main screen, the edition and the selection of another slide may be conveniently performed while confirming the slide show screen.

Further, in a general web shopping homepage, when the product is selected in the search result list page after searching the product, the current screen is moved to a detailed information page screen, and as a result, it is cumbersome that shopping should be performed while the search result list page and the product detail information page are moved forward and backward. Therefore, when the product detail information page is displayed on the main screen and the search result list page is displayed on the sub screen to display the product detail information page selected in the product search result list on the main screen, the product detail information page may be viewed by one selection, and as a result, convenience of the shopping may be doubled.

Accordingly, by a configuration of the multi-functional touch keyboard having a touch sensor described above, a touch sensor of a touch pad is attached to a keyboard surface to perform a function, but is not attached to an entire surface of a keyboard, but provides an area at least as large as an existing touch pad by considering operational efficiency and convenience, and economics of production, and the touch pad is attached up to a surface part of a character keyboard in a reverse triangular from starting from a space bar of a basic type keyboard to replace the existing mouse and a touch pad of a laptop computer performing a function as a graphic controller, and as a result, inconvenience of operating a computer with a separate graphic controller is excluded and in particular, in the case of the laptop computer, the touch pad is replaced and removed, thereby providing an efficient function by utilizing spaces occupied by a keyboard touch pad occupied by the touch pad and a lower palm rest.

Further, each of a left click key and a right click key is configured by dividing the space bar to perform a left-right click function of the mouse or the touch pad.

Furthermore, there may be an effect of the invention that the touch keyboard itself performs the function as the graphic controller and inconvenience that the mouse or the touch pad as the graphic controller is separately provided is excluded, and in particular, there is a significant meaning in that an opportunity to solve a premise of providing a sub monitor is provided by applying the touch keyboard to an integral device such as the laptop computer, resulting in becoming a start point of enjoying a benefit of providing dual monitors.

Configurations illustrated in the exemplary embodiments and drawings disclosed in the present specification are only the most preferred embodiment of the present invention and do not represent all of the technical spirits of the present invention, and thus it is to be understood that various equivalents and modified examples, which may be substituted for them at the time of filing the present application.

The invention claimed is:
1. A multi-functional touch keyboard having a touch sensor, comprising:
a key cap unit with a character key cap, a function key cap, a numeric key cap, a special key cap, and a direction key cap;
a driving circuit unit constituted by a contact point and a membrane switch each coupled to a lower end of a corresponding key cap of the key cap unit;
a support supporting the membrane switch;
a touch pad constituted by touch sensors formed on upper ends of the multiple key caps groped in a specific shape, respectively;
a left click key and a right click key formed adjacent to both ends of the touch pad; and
a control unit moving a cursor in conjunction with a touch of the touch pad and performing a click function by pressing the click keys,
wherein the multi-functional touch keyboard performs a touch pad function as a graphic controller while performing basic functions as a keyboard,
wherein the touch pad is formed by grouping up to the character key caps in a reverse triangular form based on a space key cap,
wherein the click key is formed on each of both ends of the space key cap,
wherein the touch sensor is formed on each of upper ends of the space key cap, six key caps on a lower line of the character key cap, seven key caps of an intermediate line, and eight key caps of an upper line,
wherein the key cap unit and the touch pad are disposed at a touch pad of a laptop computer or a lower palm rest location,
wherein a partition having a predetermined height is formed on an upper periphery of the corresponding key cap constituting an outline of the touch pad to separate a touch area of the touch pad, and
wherein a horizontal scroll is performed by horizontally touching a touch pad area on an upper end surface of the space key cap in conjunction with double strokes of the right click key, a vertical scroll is performed by vertically touching the touch pad area except for the space key cap, a left click and double clicks are performed by a stroke and double strokes of the left click key, and a right click is performed by a stroke of the right click key.

2. The multi-functional touch keyboard having a touch sensor of claim 1, wherein the corresponding key cap constituting the outline of the touch pad and another adjacent key cap are formed spaced apart from each other at a predetermined distance to separate the touch area of the touch pad.

\* \* \* \* \*